July 8, 1930.　　　P. H. WATKINS　　　1,769,977
RUBBERIZED HANDWEAR
Filed Jan. 4, 1927
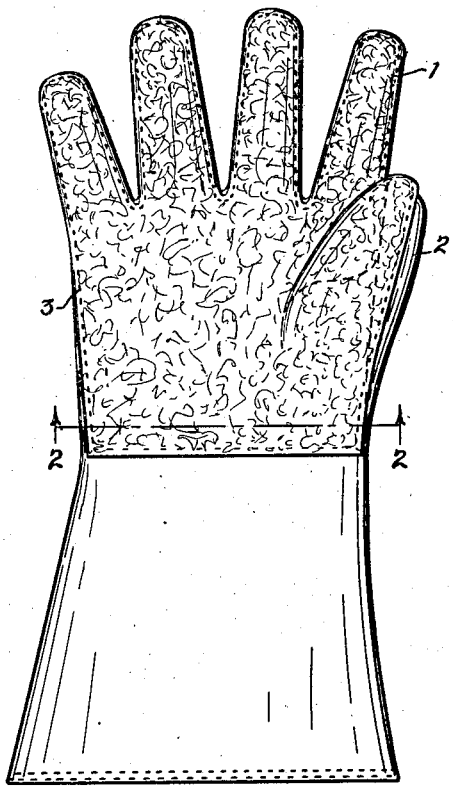
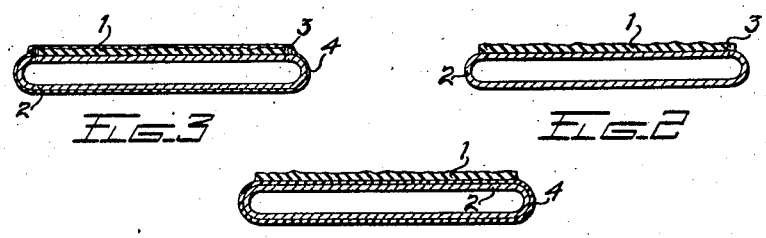
INVENTOR:
Parke H. Watkins
By Ernest Hopkinson
ATTORNEY Patented July 8, 1930

1,769,977

UNITED STATES PATENT OFFICE

PARKE HAFFIELD WATKINS, OF LEONIA, NEW JERSEY, ASSIGNOR TO GOODYEAR'S INDIA RUBBER GLOVE MFG. CO., OF NAUGATUCK, CONNECTICUT, A CORPORATION OF CONNECTICUT

RUBBERIZED HANDWEAR

Application filed January 4, 1927. Serial No. 158,903.

This invention relates to articles of handwear having a reinforcement of rubber composition. More particularly it relates to a glove or mitten having a rubber reinforcement on the palm and fingers.

The chief place of wear upon gloves during their use occurs at the palm and front of the fingers and it is desirable to incorporate some sort of wear resistant material at this portion of the glove in order to prolong its life. When gloves become wet they become more or less slippery and it is difficult to hold articles with them. Consequently, it is desirable to modify the surface of the glove so as to improve its gripping qualities.

It is an object of this invention to provide a glove bearing a reinforcement of rubber composition. Another object is to provide a glove reinforced with a sheet of rubber having cup-like depressions in the surface thereof.

For a complete disclosure of the nature and objects of the invention, reference is had to the accompanying specification and drawings, in which latter:

Fig. 1 is a front elevation of a glove showing the reenforcement;

Fig. 2 is a transverse section along the line 2—2 of Fig. 1;

Fig. 3 is a cross section of a modified form of glove; and

Fig. 4 is a cross section of an additional modified form of glove.

In carrying out the invention in its preferred form, crepe rubber is prepared in the following way:

A mass of rubber is compounded on a mill with such curative agents and fillers, as may be desired, a suitable composition comprising:

| | Parts by weight |
|---|---|
| Rubber | 100 |
| Zinc oxide | ½ |
| Sulphur | 2 |
| Zinc dimethylamine dithiocarbamate | ½ |

This compound is sheeted in the form of crepe rubber to the desired thickness. The term crepe rubber is used in its usual significance to define a rubber sheet having a rough surface provided with numerous cup-like depressions therein.

A sheet of fabric is cut into blanks suitable to be manufactured into a glove. The crepe sheet is cut into a blank 1 of the size and shape of the palm, fingers and thumb of the glove. It is affixed to the corresponding blank 2 of fabric by a layer of rubber cement, a suitable composition for which is rubber 10 parts by weight and benzol 90 parts by weight. The cement is applied to the fabric after which the crepe rubber sheet is secured in place with or without the use of pressure. To further secure the crepe, the edges of the two are stitched together with thread 3. The blanks are then fabricated into the form of a glove which can now be used as a completed article, a cross section of which is shown in Fig. 2, or it can be vulcanized by heating the same for approximately one hour at 220° F. Under some circumstances it may be desirable to vulcanize under pressure.

It may be desirable to formulate a waterproof glove such as is illustrated in cross section in Fig. 3 in which case the crepe reinforced fabric glove just described is placed before vulcanization upon a suitable form and is sprayed or dipped or both with a dispersion of rubber composition. A suitable composition comprises:

| | Parts by weight |
|---|---|
| Dry rubber (as semi-cured latex containing 40% solids) | 100 |
| Zinc oxide | 60 |
| Lithopone | 40 |
| Ultramarine blue | ⅛ |
| Glue | 20 |
| Sulphonated castor oil | 5 |
| Sulphur | 2 |
| Zinc dimethylamine dithiocarbamate | ½ |
| Sodium silicate | 1 |
| Nujol emulsion | 25 |
| Nekal | 2 |
| Sodium resinate | 1½ |

This composition forms a dispersion of rubber in water containing about 55% of solids. If any or all of the rubber composition is to be applied to the glove by spraying, it is desirable to dilute the same with sufficient water to form a composition containing approximately 45% solids. The zinc oxide, lithopone and ultramarine blue function as coloring agents. The glue and the sodium silicate act as stabilizers. The sulphonated castor oil gives a smooth surface to the rubber coating. The nekal functions as both a stabilizer and a thinning agent, while the sodium resinate serves as a thinning agent. The nujol acts as a softening agent. The sodium resinate aids in incorporating the emulsion into the dispersion. The glue assists in rendering the finished article resistant to gasoline. It will be understood that the composition can be varied as desired without departing from the spirit of the invention.

The rubber coated glove thus prepared is now vulcanized by heating the same for approximately one hour at 220° F. under suitable pressure or can be otherwise vulcanized as may be necessary, depending upon the particular compound used. There has now been formed a fabric glove reinforced with crepe rubber 1 and having a coating 4 of rubber composition encasing the entire glove.

As an alternative, a glove, such as has been illustrated in Fig. 4, can be manufactured. In so doing, a fabric glove is fabricated in the usual manner, after which it is dipped in a dispersion of rubber of a composition similar to that previously disclosed, after which it is dried and a layer of rubber cement is applied to the palm, fingers and thumb of the glove. A sheet of crepe rubber composition is affixed in place over the cement. Vulcanization of the assembled parts results in a glove having a base 2 of fabric, a coating of rubber composition 4 and a reinforcement of crepe rubber 1 upon the surface.

While the invention has been described as applied to the use of crepe rubber composition for reinforcing the palm, smooth sheet stock could be used instead and some of the advantages of the invention realized. Likewise, the invention is not limited to the use of a fabric backing for the glove, but other suitable materials such as leather can be used. By the term "disperson of rubber" as used in the specification, is meant to include either latex in an uncured or partially cured state or an artificial dispersion of rubber. A solution of rubber can be used in place of the dispersion and some of the benefits of the invention realized.

The article obtained by the method described, has a rough non-slipping surface, which quality is present whether the glove is dry or wet. Small vacuum cups are obtained upon the surface of the glove when it grips an object both when the crepe rubber is uncoated and when it is coated with a thin film of rubber composition. These vacuum cups aid the glove in gripping an object. The glove is particularly adapted for rough heavy work such as in handling brick, cement, machinery, etc. When the glove is entirely coated with rubber composition, it is suitable for use around acid plants. When made only of fabric with the crepe palm, the glove presents a water proof surface to the article to be gripped and at the same time permits ventilation of the hand through the back of the glove.

Having thus described my invention, what I claim and desire to protect by Letters Patent is:

1. A glove comprising hand and wrist portions made of fabric exteriorly coated with waterproofing composition, and a layer of vulcanized crepe rubber fixed to and covering the palm and front portions of the fingers and thumb.

2. A glove of fabric coated with a thin layer of vulcanized rubber composition, and a layer of vulcanized crepe rubber relatively thick as compared to the other layers of the article covering the palm and face portions of the fingers and thumb of the glove.

3. A glove of fabric coated with a thin layer of vulcanized rubber composition, and a layer of vulcanized crepe rubber relatively thick as compared to the other layers of the article covering the palm and face portions of the fingers and thumb of the glove, said crepe rubber being united to the thin layer of rubber composition by vulcanization.

Signed at New York, county and State of New York, this 11th day of December, 1926.

PARKE H. WATKINS.